US008437254B2

(12) United States Patent
O'Sullivan et al.

(10) Patent No.: US 8,437,254 B2
(45) Date of Patent: May 7, 2013

(54) DYNAMIC CONFIGURATION OF VOIP TRUNKS

(75) Inventors: Mark O'Sullivan, Northall (GB); Graham Streit, London (GB); Mario Zancan, Mitcham (GB)

(73) Assignee: Avaya UK, Surrey (GB)

( * ) Notice: Subject to any disclaimer, the term of this patent is extended or adjusted under 35 U.S.C. 154(b) by 1530 days.

(21) Appl. No.: 11/864,194

(22) Filed: Sep. 28, 2007

(65) Prior Publication Data

US 2008/0186958 A1    Aug. 7, 2008

(30) Foreign Application Priority Data

Sep. 29, 2006    (GB) .................................. 0619267.8

(51) Int. Cl.
*H04L 12/26*    (2006.01)
*H04L 12/66*    (2006.01)
*H04M 3/42*    (2006.01)

(52) U.S. Cl.
USPC ....... 370/232; 370/235; 370/356; 379/201.12

(58) Field of Classification Search ................ None
See application file for complete search history.

(56) References Cited

U.S. PATENT DOCUMENTS

| 6,931,111 | B1* | 8/2005 | Coffee ..................... 379/201.12 |
| 2003/0043992 | A1* | 3/2003 | Wengrovitz .................. 379/229 |
| 2007/0121602 | A1 | 5/2007 | Sin et al. |
| 2007/0121885 | A1* | 5/2007 | Sin et al. ....................... 379/219 |
| 2007/0153770 | A1* | 7/2007 | Goyal et al. .................. 370/352 |

FOREIGN PATENT DOCUMENTS

| EP | 1 158 755 A2 | 11/2001 |
| WO | WO 03/007489 A2 | 1/2003 |

* cited by examiner

*Primary Examiner* — Melanie Jagannathan
(74) *Attorney, Agent, or Firm* — Muncy, Geissler, Olds & Lowe, PLLC

(57) ABSTRACT

A method of configuring Internet telephony services for a private branch exchange includes providing the requirements for the private branch exchange to an Internet telephony service provider, establishing, at the Internet telephony service provider, configuration data for the requirements, providing the established configuration data to the private branch exchange, and processing the established configuration data at the private branch exchange.

26 Claims, 8 Drawing Sheets

DYNAMIC CONFIGURATION OF VOIP TRUNKS

CROSS-REFERENCE TO RELATED APPLICATIONS

This application claims the benefit under 35 U.S.C. §119 of Great Britain Patent Application No. 0619267.8, entitled DYNAMIC CONFIGURATION OF VOIP TRUNKS which was filed on Sep. 29, 2006, the entirety of which is incorporated by reference herein.

BACKGROUND

1. Field of the Invention

The present invention relates to the establishment of trunks for private exchanges using Internet telephony service providers.

2. Description of the Related Art

Internet telephony services allow for the provision of telephony services at reduced costs. For enterprises (such as companies) where there is a large number of users of telephone systems the cost savings can be significant.

Typically for the provision of Internet telephony services for an enterprise there are two configuration steps required. The private branch exchange (PBX) or PBXs of the enterprise must be configured and the Internet telephony service provider (ITSP) for providing the VoIP services must be configured.

The configuration typically comprises a number of discrete steps, including: provisioning of trunks via the ITSP usually via a web interface; purchasing of telephone numbers; allocation of extension numbers or other identifiers that are used to identify individual trunks; defining of a mapping policy that defines how an ITSP number is represented by a PBX recognised format; etc. All of this information needs to be entered both at the ITSP and at the PBX. At the PBX there may typically be a need for additional processing of ITSP identifiers to enable routing to internal destinations.

In an enterprise environment with a large number of users this configuration may not be trivial. Further when updates are required the updates must also be configured at both the PBX and the ITSP.

Such a dual configuration provides a burden and is also error prone. Small businesses may typically use DSL/ADSL connections with dynamic IP addressing. In such an environment the need to update configurations to take into account dynamic IP address changes means the use of Internet telephony services may be unattractive.

It is an aim of the invention to provide an improved technique which addresses one or more of the above identified problems.

SUMMARY

According to the present invention there is provided a method of configuring Internet telephony services for a private branch exchange comprising: providing the requirements for the private branch exchange to an Internet telephony service provider; establishing, at the Internet telephony service provider, configuration data for the requirements; providing the established configuration data to the private branch exchange; and processing the established configuration data at the private branch exchange.

The invention thus provides a technique for the automated or dynamic configuration of Internet telephony services for a private branch exchange.

The requirements of the private branch exchange are preferably user/customer/client specified.

The configuration may be initiated at the Internet telephony service provider and the step of providing the requirements of the private branch exchange includes providing such directly to the Internet telephony service provider. The configuration data may be entered by a user via a web portal associated with the Internet telephony service provider.

The step of providing the established configuration data may comprise transmitting a SEP INVITE message. The SIP INVITE message may include the established configuration data.

The method may further include the step of, responsive to successful completion of the transmission of the SIP INVITE message, transmitting a SIP INFO message. The SEP INFO message may include the established configuration data.

The step of providing the established configuration data may comprise transmitting an instant messaging MESSAGE message. The instant messaging MESSAGE message may include the established configuration data.

The configuration may be initiated at the private branch exchange.

The step of providing the requirements of the private branch exchange may include transmitting such requirements from the private branch exchange.

The step of providing the requirements of the private branch exchange may include transmitting a SIP INVITE message from the private branch exchange. The step of establishing configuration data for the requirements may be enabled responsive to receipt of the SIP INVITE message. The step of providing the established configuration data to the private branch exchange may include transmitting a SIP INFO message. The SIP INFO message may include the established configuration data.

The step of providing the requirements of the private branch exchange may include transmitting a SIP SUBSCRIBE message from the private branch exchange. The step of establishing configuration data for the requirements may be enabled responsive to receipt of the SIP SUBSCRIBE message. The step of providing the established configuration data to the private branch exchange may include transmitting a SIP NOTIFY message.

The SIP NOTIFY message may include the established configuration data.

The method may further include the step, responsive to any change in the configuration data, of transmitting a further NOTIFY message from the Internet telephony service provider.

The method may further comprising the step of including a request to supply additional phone numbers in the step of providing the requirements, based on a telephone number area code.

The invention further provides an Internet telephony service provider arranged to receive a user requirement and to generate a data configuration block for the user in dependence on said user requirement; and further arranged to transmit said data configuration block to a private branch exchange associated with said user. The Internet telephony service provider may be further arranged to package the data configuration block in a SIP message for transmission to the private branch exchange.

The invention yet further provides a private branch exchange arranged to receive a message from an Internet telephony service provider containing configuration data for the private branch exchange, extract the configuration data, and process the configuration data. The message may be a SIP message, the private branch exchange being arranged to extract the configuration data from the SIP message.

The invention further provides a telephony system adapted to perform one or more steps of a method disclosed herein, or any telephony element disclosed herein.

DESCRIPTION OF PREFERRED
EMBODIMENTS

The invention is now described with reference to various embodiments. It should be understood that the invention is not limited to specific aspects of any one embodiment.

The embodiments of the invention may be implemented in an environment where an enterprise, such as a company, having a PBX (private branch exchange) system or systems intends to take advantage of the services provided by an ITSP (Internet telephony service provider). An ITSP offers an Internet data service for making telephone calls using VoIP (Voice over IP) technology. Typically ITSPs use SIP (session initiation protocol) for transmitting telephone calls as IP data packets. The advantages of using an ITSP for an enterprise include cost savings and increased functionality.

Figure 1:
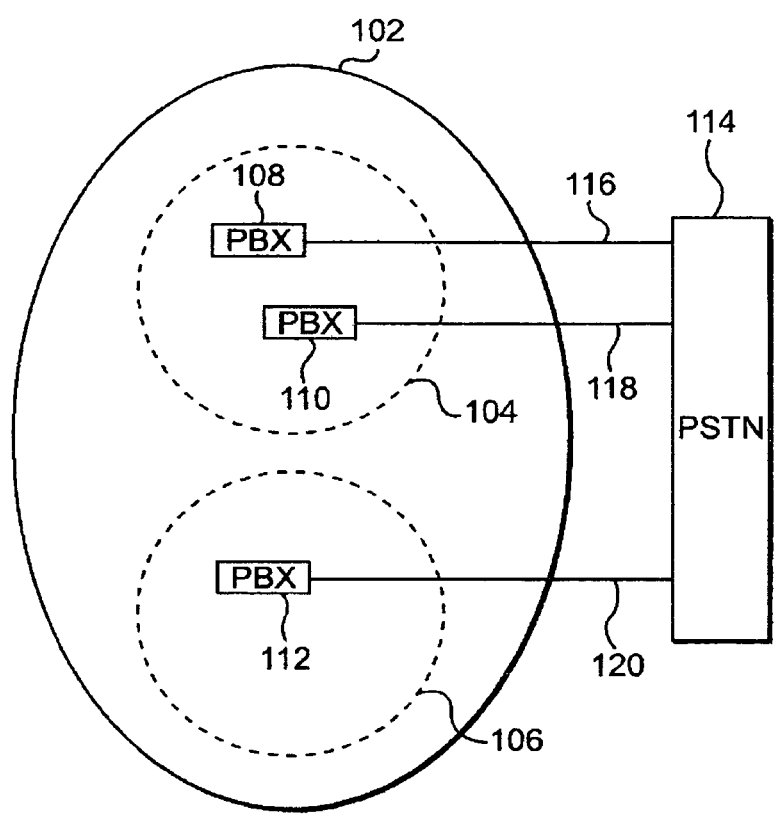
FIG. 1 illustrates a PBX environment in which embodiments of the invention may be implemented.

A typical enterprise environment in which the present invention may be implemented is illustrated schematically in FIG. 1. An enterprise 102 has sites at two distinct geographical locations 104 and 106. At location 104 the number of enterprise subscribers is such that two PBXs 108 and 110 are provided. At location 106 a single PBX 112 is provided. Each PBX 108, 110, 112 connects to a PSTN (public switched telephone network) 114 via respective connections 116, 118, 120. It will be understood by one skilled in the art that in general an enterprise may be provided with one or more PBXs located at one or more geographical locations or sites.

In accordance with embodiments of the invention there are provided techniques for enabling the dynamic configuration of ITSP services for at least one PBX. This provides for the dynamic configuration of VoIP trunks for at least one PBX, preferably SIP tranks.

The process can be initiated from either end (customer site or service provider). The core information exchange is the same in both scenarios, and there is always provision to enable the configuration to be exchanged out of band. In general the embodiments of the invention provide for the dynamic configuration to be initiated in two ways: from the PBX or from the ITSP. The first to third embodiments described hereinafter are examples of initiation from the PBX; the fourth and fifth embodiments are examples of initiation from the ITSP. In either case, however, the initiation is prompted by a user or subscriber (typically an administrator) of the PBX.

In the embodiments the ITSP provides for establishments of VoIP trunks using SIP. This is typically the way in which VoIP calls are currently established. It will be understood by one skilled in the art that other protocols may be used.

Processing of the configuration is a common facility to all the scenarios and hence it is covered specifically along with the configuration data (Configuration Block) that is exchanged.

The embodiments are described in the context of a customer or client associated with a customer site and a PBX provided at that customer site. In practice the customer or client may be physically remote from the actual customer site where the PBX is located.

Figure 2:
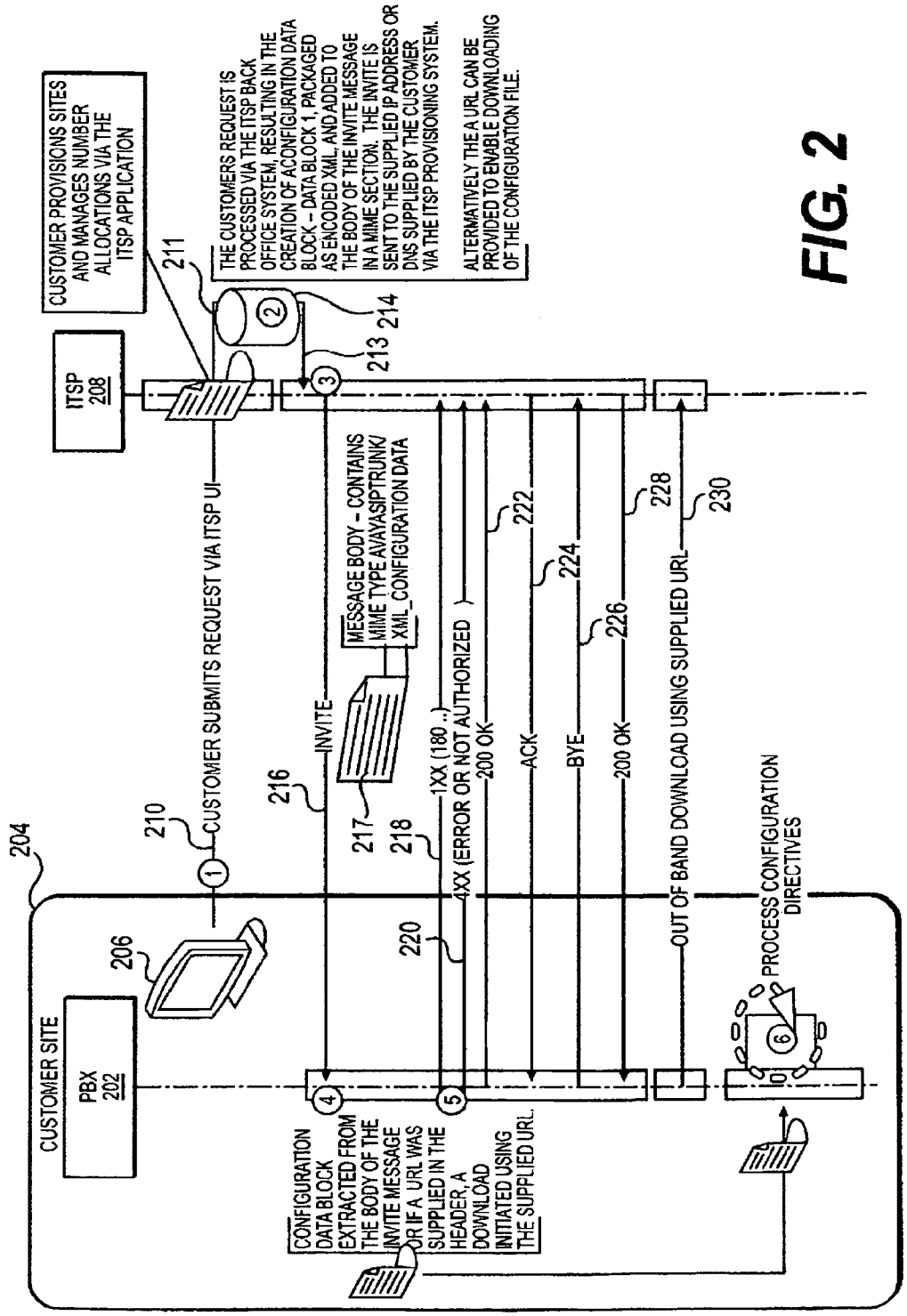
FIG. 2 illustrates a signalling exchange in accordance with a first embodiment of the invention.

A first embodiment of the invention is described with reference to FIG. 2 for an example implementation where the initiation is from an Internet telephony service provider (ITSP) using an INVITE message. In FIG. 2 there is illustrated a PBX 202 at a customer site 204. A terminal 206 represents a user terminal of a subscriber or client of the PBX 202, typically a user terminal of a system administrator. An ITSP is denoted by reference numeral 208.

The dynamic configuration is initiated by the client 206 utilizing the ITSP provisioning environment. In this example the ITSP provisioning environment is a web site. The client 206 logs on to the ITSP website and enters a location that identifies a target PBX (the PBX 202) and provides key information such as: a public IP Address; optionally a SIP URI that the configuration data will be targeted to; a user name and password to use if the INVITE is initially challenged to authenticate; and the transport UDP/TCP/TLS. The client also defines the telephone numbers, and mappings to internal URIs using the ITSP interface. The operation of this first embodiment is now described.

In a first step the customer or client 206, using an established ITSP account, defines a new site/location corresponding to the PBX 202. The customer provisions sites and manages number allocations via the ITSP application. The customer provides information such as "IP Address", "Port", "SIP URI", "User Name" and "Password". The customer assigns purchased phone numbers which includes any mapping which is used to identify calls. The customer thus creates a configuration data package. Once provisioned, the customer issues a request to the ITSP to send the configuration data package to the PBX. The submission of the customer request via an ITSP user interface (UI) is denoted in FIG. 2 by signal 210.

On receipt of the request 210, in a second step, the ITSP provisioning system passes the received request to a backend system(s) 214. The passing of the request to the backend system 214 is denoted by signal 211. The backend system 214 extracts the customer request and prepares the data obtaining the information from the supporting systems, and packages the data into a so-called configuration block.

The configuration block contains the core information necessary to enable the creation of a correctly configured SIP trunk using the infrastructure elements defined by the ITSP and the site-specific phone numbers associated with the site. In addition to this information there is included a number of supporting directives that identify how the data should be treated.

The configuration data may be implemented using XML. Table 1 describes the content of the data and how it is logically organized. This solution uses existing Web Service (WS) standards to encapsulate the configuration data, supporting message signing and encryption. Closing tags are omitted for clarity. The purpose of Table 1 is to convey the configuration data that may be exchanged for SIP tranking configuration in accordance with embodiments of the invention.

TABLE 1

| | |
|---|---|
| <env:Envelope ...> | |
| <env:Header> | |
| <wsse:Security...> | Provide digital signature and encryption info (if used) |
| <env:Body wsu:Id="Body"> | Body of the Message, reference by encryption block, this would be stored in the EncryptedData node. |
| <avdtc:SIPConfiguration CustomerID="Some ID"> | The container for all configuration sections, attribute to indicate customer ID |
| <avdtc:Infrastucture ChgSeqNo = "342"> | SIP Infrastructure block - Change Sequence Number increments when data is changed |
| Proxy IP Address | |
| Proxy Port | |
| Outbound Proxy | |
| Outbound Proxy Port | |
| Transport Scheme | |
| STUN Server | |
| DNS Server | |
| Overall SIP Message Timeout (ms) | |
| Provisional SIP Replies Timeout (ms) | |
| Provisional SIP Rely Resend (ms) | |
| Resend SIP Message After (ms) | |
| Maximum Message Size | |
| Local IP Address Discovery Src | External Server used to obtain public IP Address |
| RegistrationRequired | Trunk Requires SIP Register |
| Authentication Token | Token for Registration |
| Password Token | Token for authentication |
| <avdtc:ITSPInfo> | ITSP Information |
| Vendor Name | Name of ITSP |
| Vendor Support Site URL | Support Web Site |
| Diagnostics URI | URI of support Agent |
| <avdtc:Locations> | Locations Container, sites |
| <avdtc:Location HomeSite="true" ChgSeqNo ="876"> | Location contains details of all sites, the site associated with this PBX is marked, the other sites are provided for customer site topology. |
| Location Reference ID | |
| Location Name | |
| Public IP Address | |
| NAT Profile | |
| <avdtc:PhoneNumbers ChgSeqNo="12" Remove> | Container for provisioned phone numbers |
| ID | Unique ID for this record |
| Location ID | Location that this phone number is mapped to |
| DDI | Phone Number |
| DNIS | Number that will be presented - Called Number or Name |
| MappingTreatment | Enumeration indicating how to treat the DNIS |
| Default Number | Indicates that the phone number is a default for the location |

Referring again to FIG. 2, in the second step the customer request is thus processed via the ITSP backend system 214, resulting in the creation of a configuration data block, which may be referred to as Data Block 1. The thus created configuration data block is provided by the ITSP backend 214 to the communications sub-system over signal line 213.

This configuration data block, illustrated schematically by reference numeral 217, is packaged as encoded XML and added to the body of a SIP INVITE denoted by reference 216 message in a MIME section. The structure of SIP messages generally in known in the art. Alternatively a URL can be provided to enable downloading of the configuration data file. The configuration data block may be encrypted using existing encryption methods. A block header of the INVITE message may contain the unencrypted delivery information and the digital signature of the encrypted data. The data is then ready for transmission using the supplied address data, either the supplied IP address or DNS of the PBX 202 supplied by the customer via the ITSP provisioning system.

In a third step a SIP INVITE message is initiated or transmitted by the ITSP. The SIP INVITE message contains the configuration data block added to the message body as a MIME type. The message body preferably contains MIME type AVAYASIPTrunk/xml configuration data. A specific name is used to enable easy identification of the content type and intent. The SIP INVITE is established using the user-provided addressing data and authenticated if challenged. The transmission of the INVITE message is denoted by signal 216.

In a fourth step the INVITE message is processed by the PBX 202, having passed any authentication. A target SIP URI identifies a specific name that identifies the intent of the INVITE (e.g. mysiteConfig@IPAddress.com). The message body is checked for MIME content using a textual name and the configuration data block extracted. If the data header indicates that the data is encrypted, the data is decrypted having verified any digital signature present (the encryption keys may be sourced from X.509 certificates, the public key made available via the ITSP provisioning system or similar means). The configuration data block is then ready for processing. Alternatively if a URL and access details are provided in the header of the INVITE message these are used to download and retrieve the configuration data block out of band. The out of band downloading using a provided URL is illustrated by signal 230.

In a fifth step the INVITE message may be challenged to enforce authentication. For this step the supplied username and password are utilized as supplied by the user. If there are any issues with the INVITE request or unexpected/missing content then the session will be rejected. Where rejection occurs, the standard process messages are presented and session is torn down in the normal fashion. Such authentication is illustrated in FIG. 2 by an exchange of messages between the PBX and the ITSP as illustrated by signals 218 to 228. Such authentication uses standard SIP messages and is outside the scope of the present invention, and therefore not further discussed.

In a sixth step the configuration data is processed to enable the automatic creation of the SIP trunk and mapping of DDI (direct dialing in) to internal routes.

A discussion of how the Configuration Data is used to automatically create/update/delete the SIP trunk and mapping of inbound phone numbers associated with the trunk to internal users/groups is now presented. The data format uses a "ChgSeqNo" (Change Sequence Number) attribute that enables easy identification of changes, when processing the data file, these are checked if an existing configuration is present and if the sequence numbers are different the data is updated, where they are the same the data is up to date and no action is taken. To enable deletion a "Remove" attribute is include to indicate that the entity should be removed.

Figure 3:
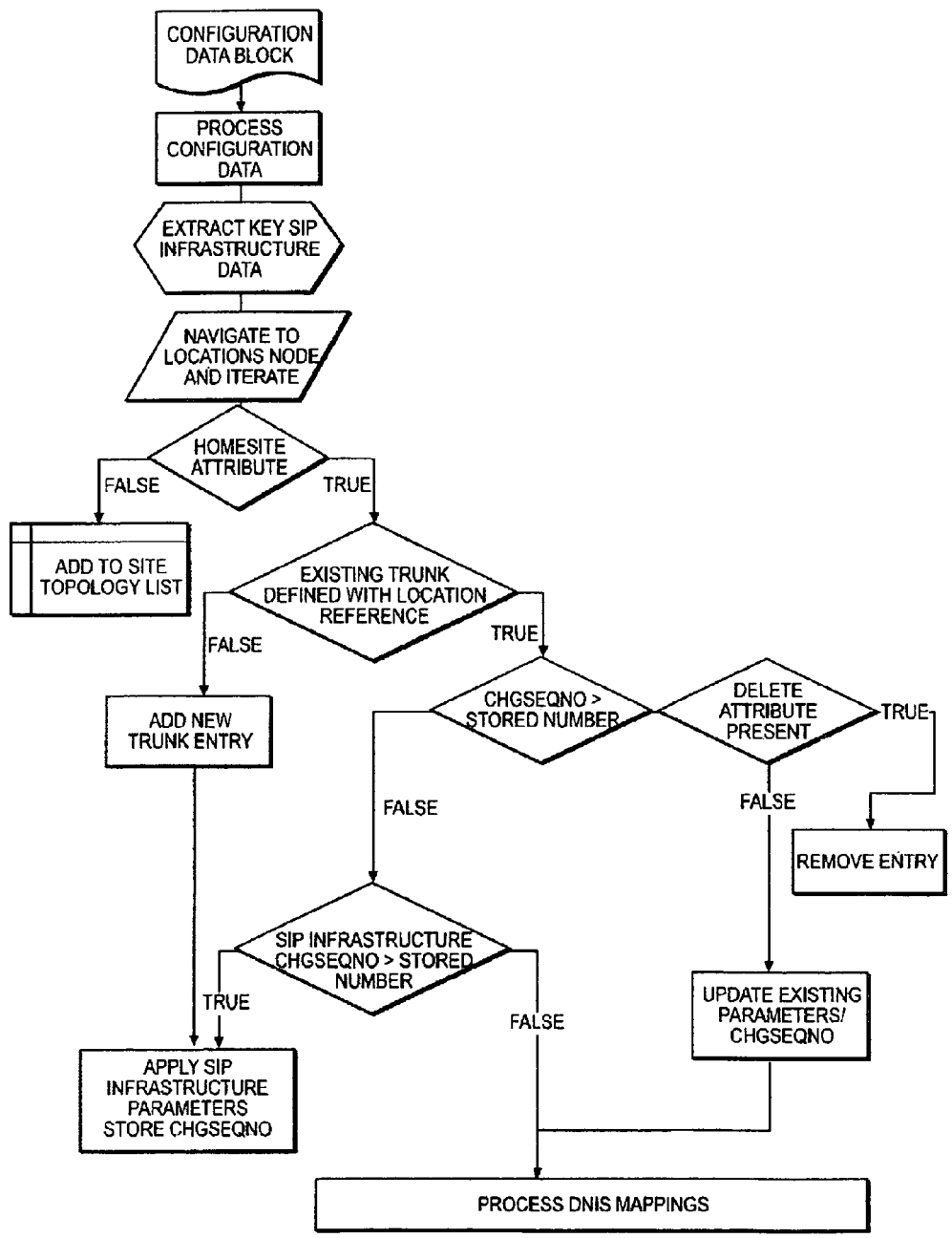
FIG. 3 is a flow diagram illustrating an exemplary technique for defining SIP trunks based on configuration data.
Figure 4:
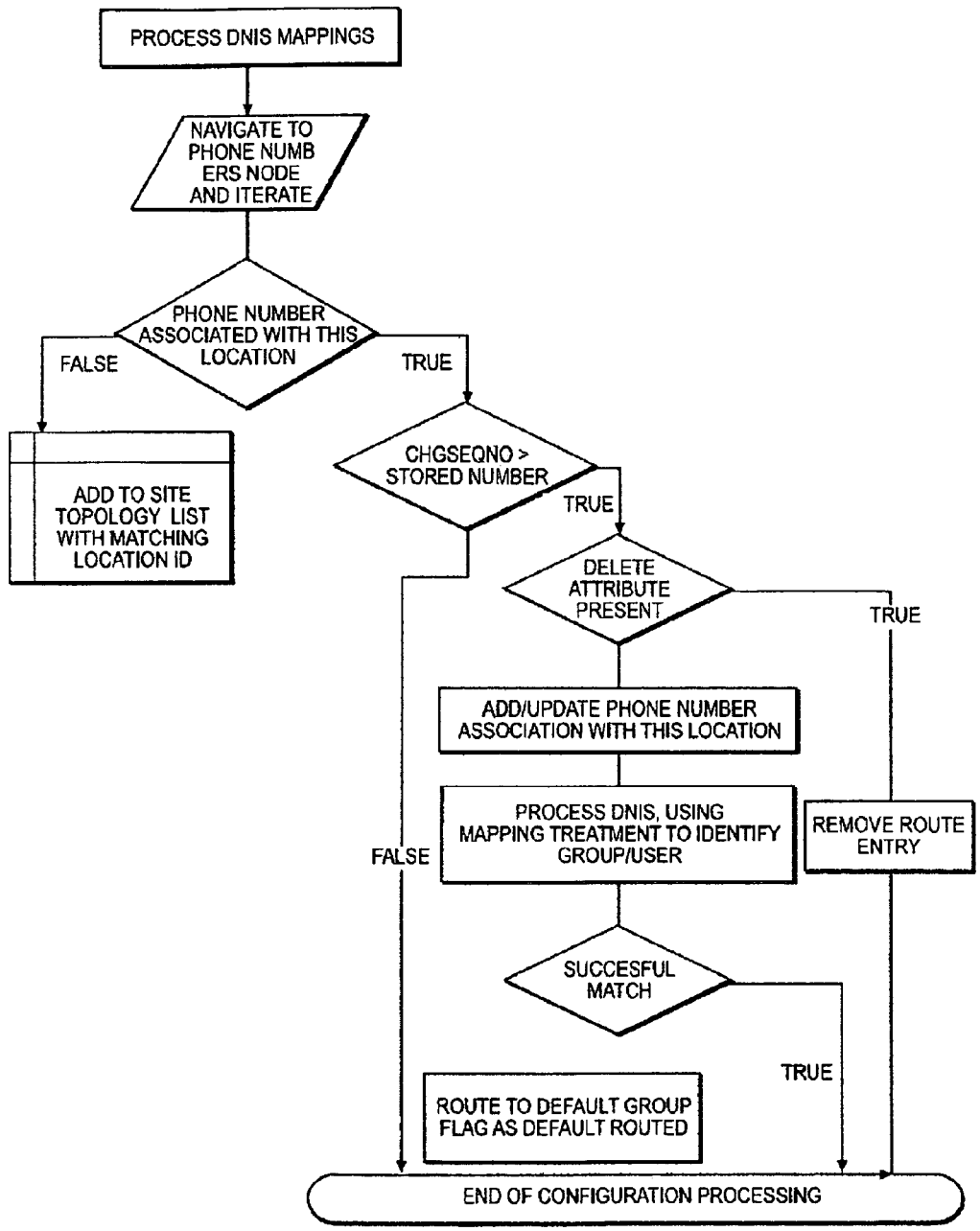
FIG. 4 is a flow diagram illustrating an exemplary technique for processing DNIS mappings to route incoming sessions.

The flow diagram of FIG. 3 shows the logic used to process the data to define the core SIP trunk based on the configuration. The flow diagram of FIG. 4 shows the logic used to process the DNIS (dialed number identification service) mappings to route incoming sessions on the trunk to internal concepts such as Hunt Group or Users, based on the Name, Number or other scheme as indicated by the MappingTreatment value.

Once the core SIP fundamentals have been processed the DNIS data for the defined phone numbers (SIP URI), this is matched to internal records (Groups, Users) and a route entry is created/updated/deleted as necessary.

A successful match is determined by referring to the MappingTreatment directive that defines how to treat the DNIS, this allows different strategies to be applied to extracting the data and what to attempt to search on to determine if such an entity exists. Using Name for example, would treat the data as a string, extracting up to the @ in a SIP URI such as mosullivan@avaya.com or if working with extension numbers 4679@avaya.com. The data is then used to search the internal configuration database to assert if a match is valid, enabling a concrete route to be configured. If the match was unsuccessful then based on policy, calls presenting this DNIS over the trunk will be routed to a main default group and the entry flag as defaulted. Policy could also support the creation of the entity using the supplied parameters and additional information (User, Group).

A second embodiment of the invention is now described with reference to FIG. 5, for an example implementation where the initiation is from the Internet telephony service provider (ITSP) provisioning site using an INFO message. In all following Figures like reference numerals are used to refer to like elements. This scenario shows an alternative, delaying the exchange of data once the session is established. The sequence follows the same basic flow as in the previous embodiment, but defers exchanging the configuration post INVITE via an INFO message.

As with the first embodiment in a third step an INVITE message is sent as represented by signal 316. The INVITE Message is sent to the supplied IP address or DNS supplied by the customer via the ITSP provisioning system to establish a SIP dialog. However unlike the INVITE message of FIG. 2 as represented by signal 216, the INVITE message of the second embodiment as represented by signal 316 does not contain the data configuration block.

After completion of the SIP session, as denoted by standard SIP signals 218 to 224, an INFO message is sent containing the data block, chunking the data is necessary, or as a URL where the data can be downloaded. The transmission of the INFO message is denoted by signal 318. The configuration data block is extracted from the INFO message, rather than from the INVITE message as in the first embodiment. Thereafter SIP signalling is competed as denoted by SIP signals 320, 226 and 228.

A third embodiment of the invention is described with reference to FIG. 6 for an example implementation where the initiation is from an Internet telephony service provider (ITSP) provisioning site using a MESSAGE (IM) message. In this implementation scenario the configuration data is sent via an Instant Message (IM) using a SIP MESSAGE. The basic flow is in accordance the first embodiment as shown in FIG. 2. The key difference is the third step where the configuration data block 217 is encapsulated in a MESSAGE as denoted by signal 322, as compared to being encapsulated in an INVITE as for the first embodiment of FIG. 2.

The MESSAGE is sent containing the data configuration block, or as a URL where the data can be downloaded. The configuration data block is extracted from the MESSAGE in the fourth step. An appropriate acknowledgement message is transmitted responsive to the MESSAGE signal as denoted by signal 324.

A fourth embodiment of the invention is described with reference to FIG. 7 in an example implementation where the initiation is from the PBX 202 site using an INVITE message. A user is denoted by reference numeral 704, and a telephone handset for use by the user is denoted by reference numeral 702.

Figure 5:
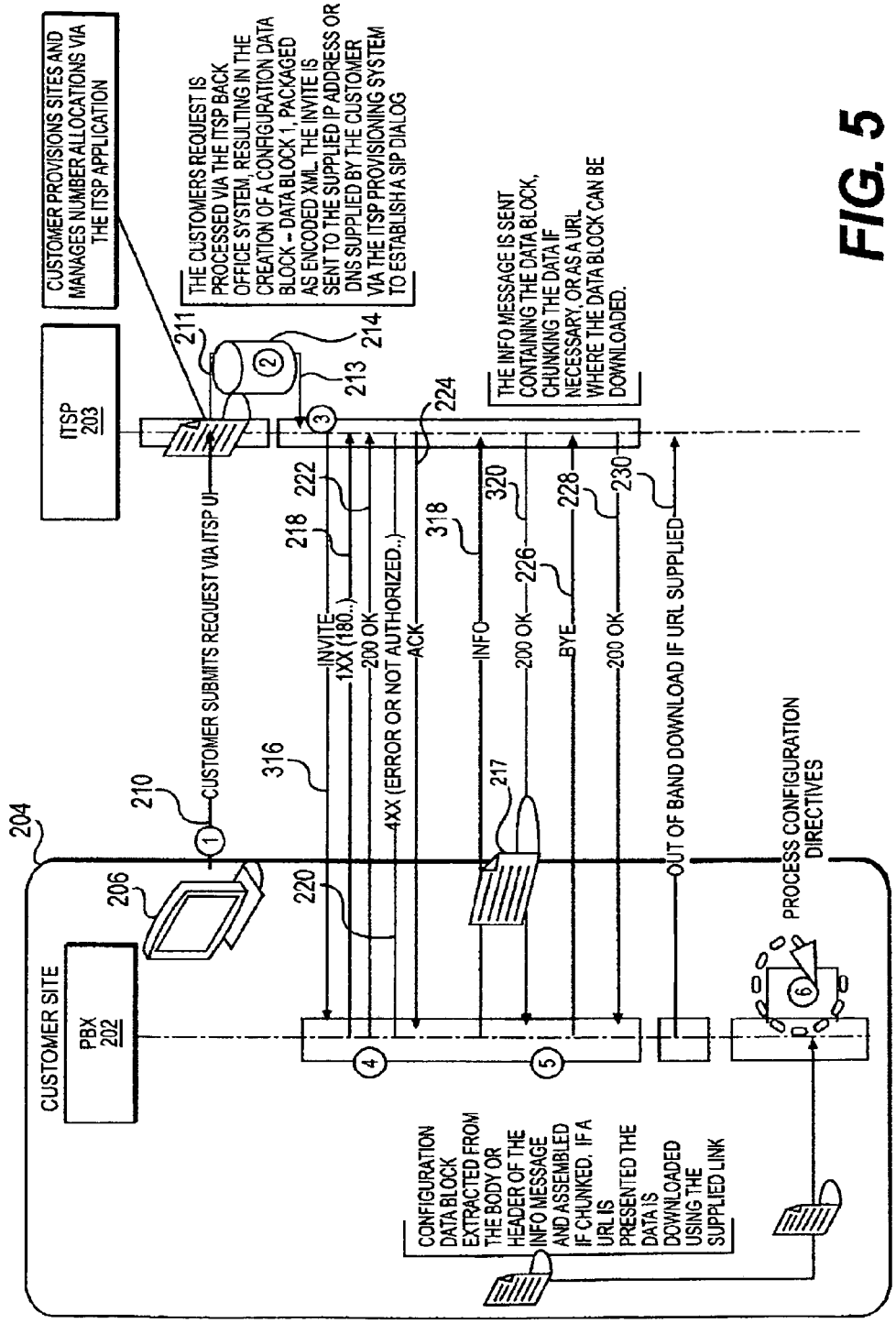
FIG. 5 illustrates a signalling exchange in accordance with a second embodiment of the invention.
Figure 6:
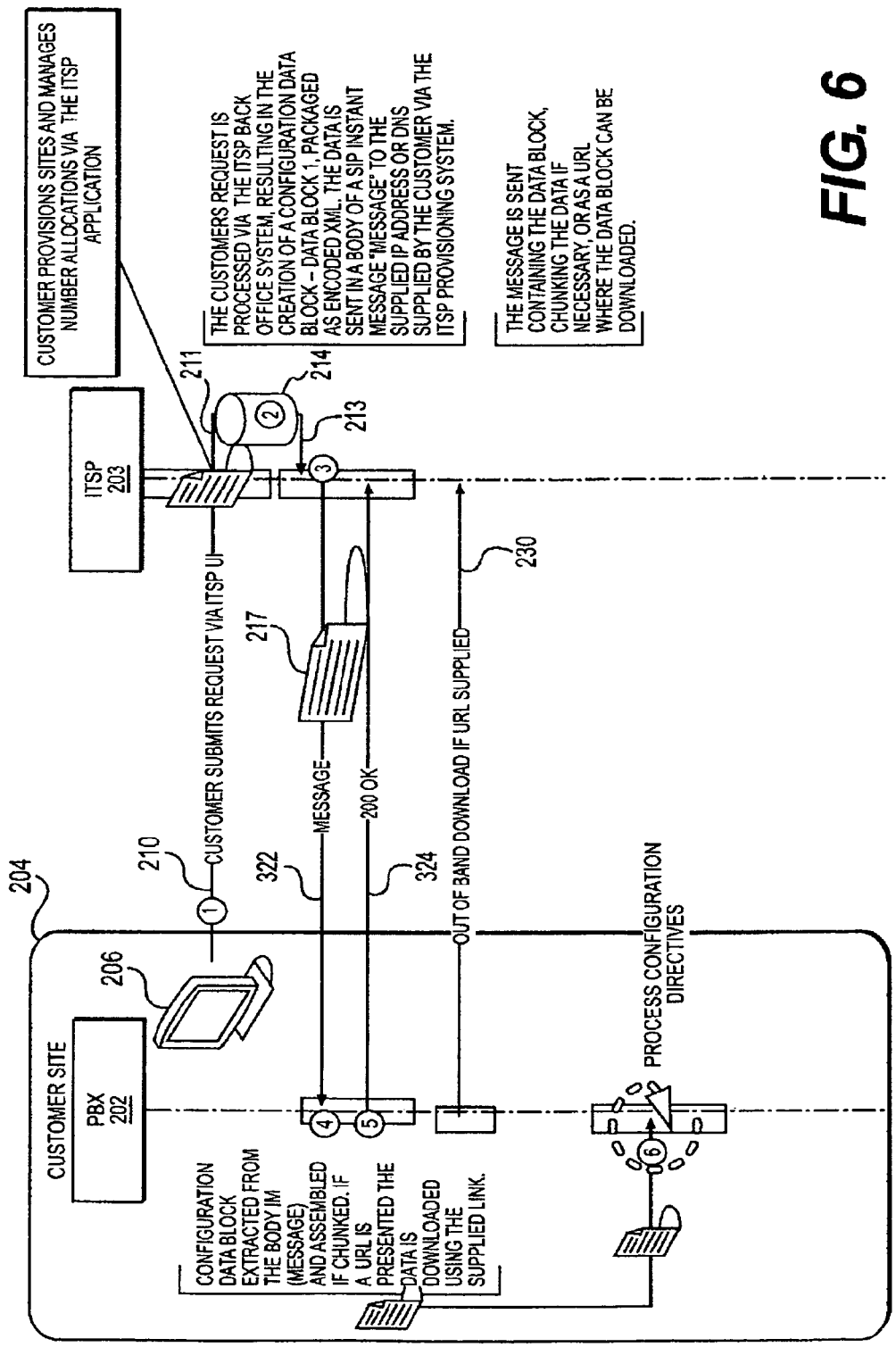
FIG. 6 illustrates a signalling exchange in accordance with a third embodiment of the invention.

The user 704 initiates a request interactively via the telephone handset 702 or via an application provided on a computer (such as computer terminal 206 shown in FIGS. 2, 5 and 6). The ITSP basic profile available to the system is an initial proxy and transport. If necessary the full IP address can be entered or an appropriate DNS name used. The customer is prompted to enter their site identifier and password, which is used to identify which ITSP configuration to use (this is already configured).

With this basic information the INVITE is initiated and sent to the ITSP, as denoted by signal 706. The message body 710 of the INVITE message contains a MIME type application/avayadtc which indicates a configuration request. The INVITE message contains the configuration data request which identifies the PBX 202 site and provides local details such as an IP Address.

This configuration request is validated and processed by the ITSP backend as described above in relation to the first embodiment, resulting in the creation of a configuration data block containing the providers' key SIP infrastructure and customer defined resources for the site. The configuration data block 217 is packaged and sent via an INFO message as denoted by signal 708.

The data configuration block is then extracted at the PBX 202 from the INFO message and validated for processing.

The configuration data block is then processed as described above for the first embodiment resulting in the necessary SIP trunk configuration and routing of customer phone numbers to internal PBX entities.

A fifth embodiment of the invention is described with reference to FIG. 8 for an example implementation where the initiation is from the PBX 202 site using a SUBSCRIBE message. This implementation scenario shows how the configuration request can be initiated via a SUBSCRIBE. This mechanism may also be used to enable ongoing feedback of configuration changes and can be used to provide this ability in any of the scenarios presented in earlier embodiments, i.e. this technique may be used for updating setup regardless of the technique for the original initiation.

In a first step the configuration request is initiated. Reference numeral 703 represents the details of the configuration request. As in the embodiment of FIG. 8 the initiation by the user 704 may be through a device or application via a user interaction or system stimuli. The basic customer site identifier and necessary authentication are then used for the following steps.

In a second step there is initiated a SUBSCRIBE message to the users site account on the ITSP. This is represented by signal 802 in FIG. 8. Any supplied authentication tokens are used if challenged. The SUBSCRIBE request expresses the customer account details in the SIP URI. Any authentication uses existing SIP facilities. The ITSP acknowledges the request with a 200 OK message as denoted by signal 804, and prepares the configuration data block.

In a third step the ITSP creates the configuration data block in response to the SUBSCRIBE message and responds with a NOTIFY message. The configuration data block 217 is packaged in accordance with the previous embodiments. The transmission of the NOTIFY message is denoted by signal 806. This first NOTIFY message is in response to the SUBSCRIBE message. The PBX 202 transmits a 200 OK message responsive to the Notify message, as denoted by signal 808.

In a fourth step subsequent changes in the configuration data result in a further NOTIFY message, with an updated configuration data block 217a. The additional NOTIFY message is denoted by reference numeral 810. A 200 OK message is received by the ITSP from the PBX responsive to the further NOTIFY message, as denoted by signal 812.

A further NOTIFY message may be generated by the ITSP at any time responsive to the ITSP becoming aware of changes in the configuration data.

Figure 8:
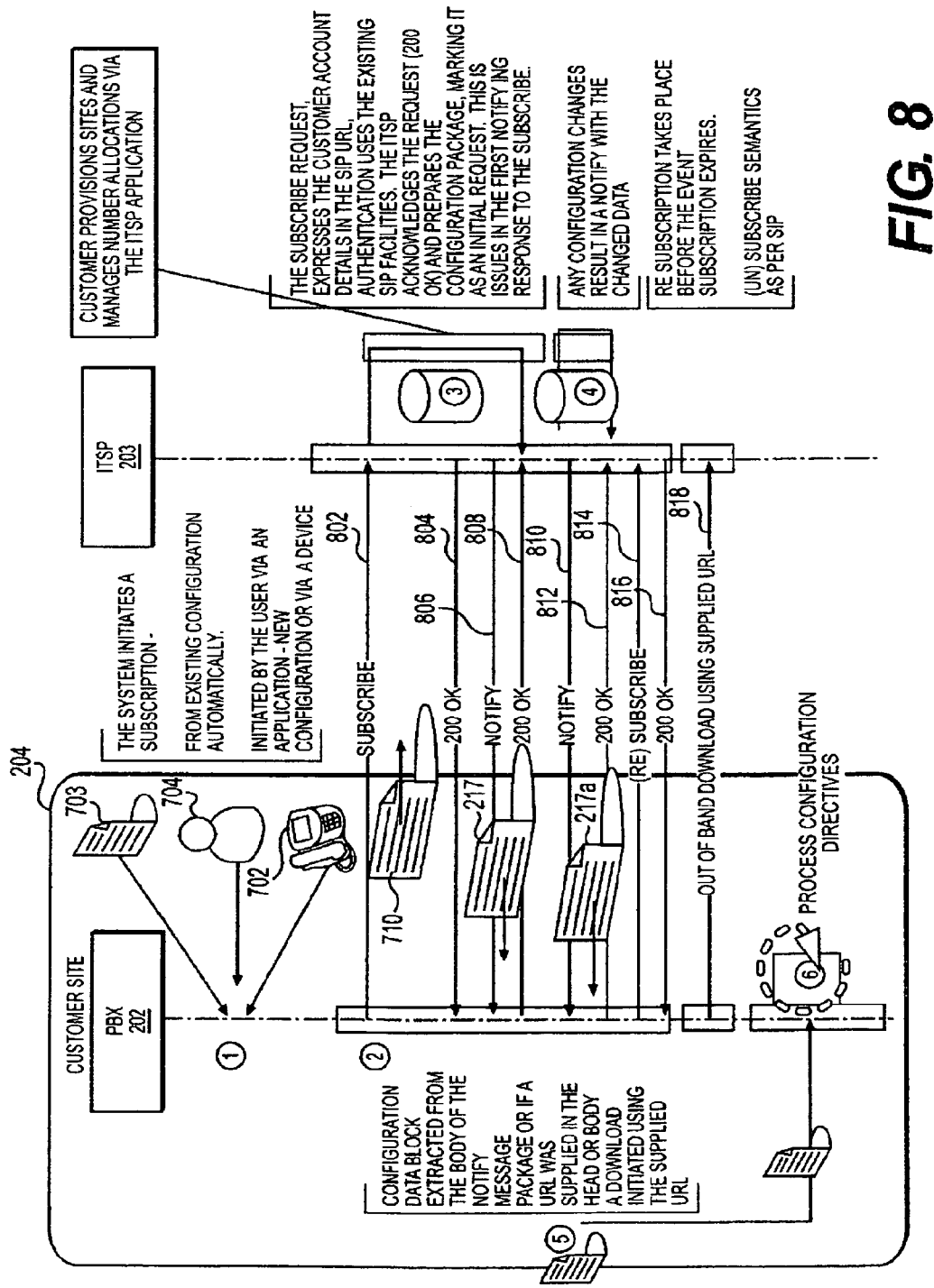
FIG. 8 illustrates a signalling exchange in accordance with a fifth embodiment of the invention.

In FIG. 8 signal 814 denotes a (re)SUBSCRIBE message sent from the PBX 202 to the ITSP 208. Such a (re)SUBSCRIBE message may be sent any time before the event SUBSCRIPTION expires. This message may be used by the PBX to keep a subscription alive.

In a fifth step the initial and any subsequent data is extracted from any NOTIFY message and prepared for processing, as described hereinabove. In a sixth step any received configuration data block is processed as described above with reference to earlier embodiments.

Figure 7:
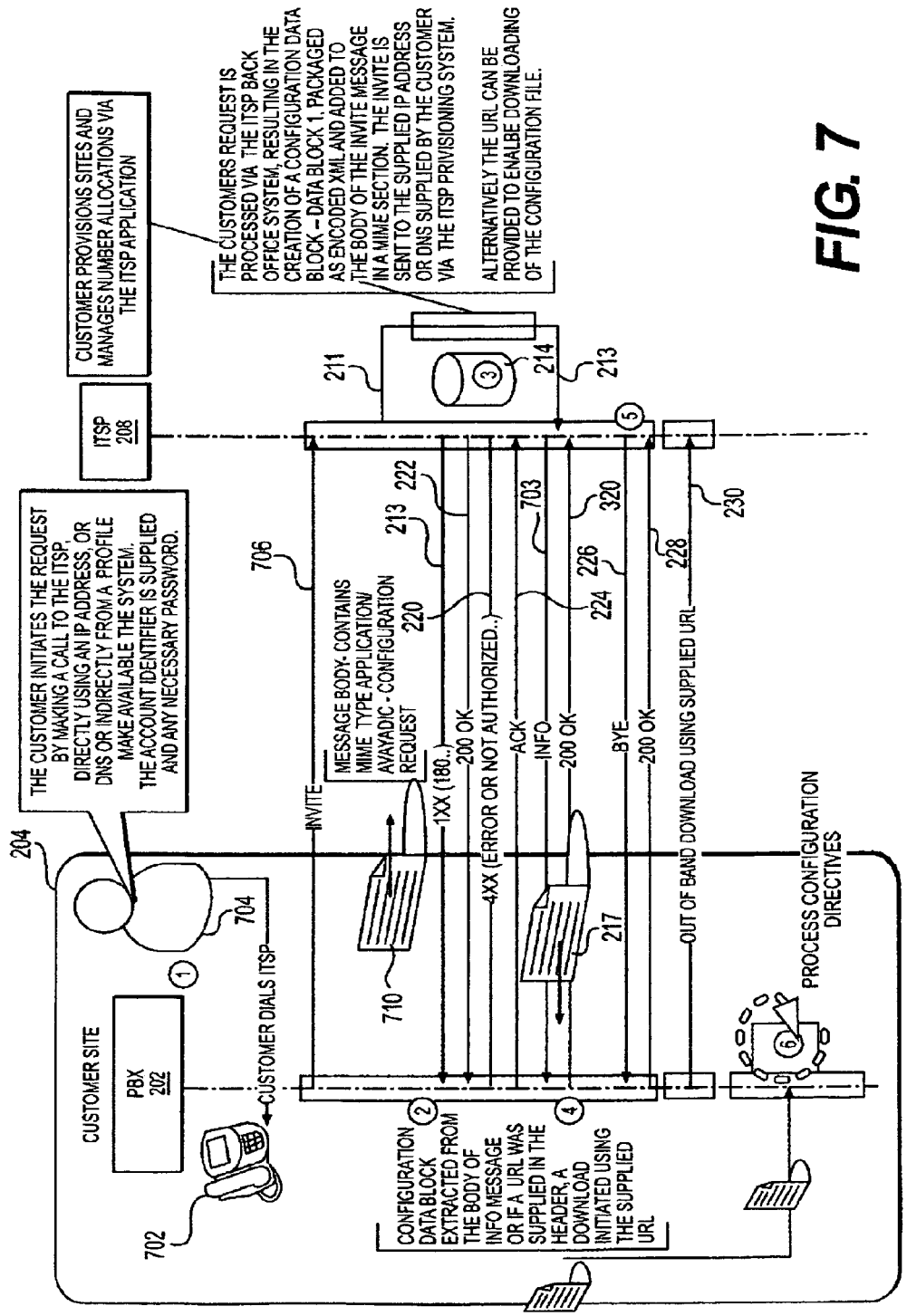
FIG. 7 illustrates a signalling exchange in accordance with a fourth embodiment of the invention.

In the embodiments of FIGS. 7 and 8, the data 710 maybe additionally used to support a request to supply additional telephone numbers based on an area code. This would have the effect of the ITSP provisioning an available telephone number based on the area code. Since this is a data change, the information would become available during the supporting mechanisms.

In summary the embodiments of the present invention provide for functionality as follows. An initiation step or sequence enables two parties, an ITSP and a PBX, to connect. Once a user or client has defined their requirements and provided them to the ITSP either directly or indirectly, the following setup and configuration is automated/dynamic. The automated steps included, preferably: the establishment of the configuration data at the ITSP (and its implementation at the ITSP); and the configuration of the PBX on receipt of that data.

The ITSP is adapted or arranged to have the functionality to use the information supplied by the client/customer in combination with the ITSP configuration data and/or account data to create the configuration block. The PBX is adapted or arranged to have the functionality to process the configuration block to effect the configuration.

The ITSP is adapted or arranged to package and transmit configuration data using the SIP protocol; and PBX is arranged to receive and unpackage the configuration data contained in a SIP message.

In the described embodiments various existing SIP messages are proposed to be used for the transport of configuration data. SIP is extensible, and one skilled in the art will appreciate that it is possible to define a new SIP message for the transport of this data. However the reuse of existing messages is preferable. Thus the functionality of the present invention may use alternative SIP messages other than INVITE, INFO, MESSAGE, SUBSCRIBE/NOTIFY, such alternative SIP messages being existing or new SIP messages.

The invention provides a technique for the dynamic configuration of VoIP trunks. The invention has particular advantages for small businesses using dynamic IP addressing. The invention allows for the ability to respond to dynamic changes in the configuration/environment in an automated way.

The invention has been described herein by way of reference to particular embodiments. One skilled in the art will appreciated that the invention is not limited to the details of any such embodiments.

The invention claimed is:

1. A method of configuring Internet telephony services for a private branch exchange comprising:
   determining requirements for the creation of a Session Initiation Protocol (SIP) trunk between the private branch exchange and an internet telephony service provider;
   providing the requirements to the Internet telephony service provider;
   establishing, at the Internet telephony service provider, configuration data for the requirements;
   providing the established configuration data to the private branch exchange; and
   processing the established configuration data at the private branch exchange.

2. The method of claim 1 wherein the step of providing the established configuration data comprises transmitting an instant messaging MESSAGE message.

3. The method of claim 2 wherein the instant messaging MESSAGE message includes the established configuration data.

4. The method of claim 1 wherein the step of providing the requirements of the private branch exchange includes transmitting such requirements from the private branch exchange.

5. The method of claim 4 wherein the step of providing the requirements of the private branch exchange includes transmitting a SIP INVITE message from the private branch exchange.

6. The method of claim 5 wherein the step of establishing configuration data for the requirements is enabled responsive to receipt of the SIP INVITE message.

7. The method of claim 4 wherein the step of providing the established configuration data to the private branch exchange includes transmitting a SIP INFO message.

8. The method of claim 7 wherein the SIP NOTIFY message includes the established configuration data.

9. The method of claim 7 wherein the SIP INFO message includes the established configuration data.

10. The method of claim 4 wherein the step of providing the requirements of the private branch exchange includes transmitting a SIP SUBSCRIBE message from the private branch exchange.

11. The method of claim 10 wherein the step of establishing configuration data for the requirements is enabled responsive to receipt of the SIP SUBSCRIBE message.

12. The method of claim 11 further including the step, responsive to any change in the configuration data, of transmitting a further NOTIFY message from the Internet telephony service provider.

13. The method of claim 10 wherein the step of providing the established configuration data to the private branch exchange includes transmitting a SIP NOTIFY message.

14. The method of claim 4 further comprising the step of including a request to supply additional phone numbers in the step of providing the requirements, based on a telephone number area code.

15. A method of configuring Internet telephony services for a private branch exchange comprising:
    providing the requirements for the private branch exchange to an Internet telephony service provider;
    establishing, at the Internet telephony service provider, configuration data for the requirements;
    providing the established configuration data to the private branch exchange; and
    processing the established configuration data at the private branch exchange wherein the step of providing the established configuration data comprises transmitting a Session Initiation Protocol (SIP) INVITE message.

16. The method of claim 15 wherein the SIP INVITE message includes the established configuration data.

17. The method of claim 15 further including the step of, responsive to successful completion of the transmission of the SIP INVITE message, transmitting a SIP INFO message.

18. The method of claim 17 wherein the SIP INFO message includes the established configuration data.

19. The method of claim 15, wherein the requirements comprise requirements for the creation of a SIP trunk between the private branch exchange and an internet telephony service provider.

20. An Internet telephony service provider comprising means for receiving a user requirement and for generating a data configuration block for the user in dependence on said user requirement; and means for transmitting a message containing said data configuration block to a private branch exchange associated with said user.

21. The Internet telephony service provider according to claim 20 further including means for packaging the data configuration block in a SIP message for transmission to the private branch exchange.

22. The private branch exchange according to claim 21 wherein the message is a SIP message, the private branch exchange being configured to extract the configuration data from the SIP message.

23. A private branch exchange comprising means for receiving a message from an Internet telephony service provider containing configuration data for the private branch exchange (PBX), means for extracting the configuration data, and means for automatically configuring the PBX based on the configuration data.

24. A telephony system including:
    at least one private branch exchange configured to receive a Session Initiation Protocol (SIP) message containing configuration data for the private branch exchange, extract the configuration data, and automatically configure the at least one private branch exchange based on the configuration data, and
    an Internet telephony service provider configured to receive a user requirement from the at least one private branch exchange and to generate a data configuration block for the at least one private branch exchange in dependence on said user requirement; and further configured to transmit said data configuration block to the at least one private branch exchange.

25. A method of configuring Internet telephony services for a private branch exchange comprising:
    providing requirements for the creation of a Session Initiation Protocol (SIP) trunk between the private branch exchange and an internet telephony service provider to the Internet telephony service provider;
    establishing, at the Internet telephony service provider, configuration data for the requirements;
    sending a message regarding the established configuration data to the private branch exchange;
    processing the established configuration data at the private branch exchange; and
    automatically configuring the private branch exchange based on the processed established configuration data.

26. The method of claim 25, wherein the message regarding the established configuration data comprises a SIP message.

* * * * *